US006246577B1

(12) United States Patent
Han et al.

(10) Patent No.: US 6,246,577 B1
(45) Date of Patent: Jun. 12, 2001

(54) CRADLE WITH COMBINED STATUS INDICATOR LIGHT AND STYLUS HOLDER

(75) Inventors: Amy Aimei Han, Mountain View; Traci Angela Neist; Dennis Joseph Boyle, both of Palo Alto; Eric Michael Lunsford, San Carlos; Robert Gregory Twiss, Portola Valley; Francis James Canova, Jr., Fremont, all of CA (US); Elisha Avraham Tal, Maccabim (IL)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/283,668

(22) Filed: Apr. 1, 1999

(51) Int. Cl.[7] ........................................................ G05F 1/16
(52) U.S. Cl. .......................... 361/686; 361/683; 364/707; 364/708; 395/326; 345/179
(58) Field of Search ..................................... 361/683, 686; 364/707, 708; 395/326; 345/179

(56) References Cited

U.S. PATENT DOCUMENTS

| 5,375,076 | * | 12/1994 | Goodrich et al. | 364/708.1 |
| 5,657,459 | * | 8/1997 | Yanagisawa et al. | 395/326 |
| 5,889,512 | * | 3/1999 | Moller et al. | 345/179 |

* cited by examiner

Primary Examiner—Leo P. Picard
Assistant Examiner—Yean-Hsi Chang
(74) Attorney, Agent, or Firm—Van Mahamedi; Wilson Sonsini Goodrich & Rosati

(57) ABSTRACT

A computer cradle is described that includes a stylus holder that is at least partially light transmissive. The light transmissive material of the stylus holder transmits to a user light generated within the computer cradle. The stylus is seated in a funnel-shaped cavity formed in a stylus holder oriented nonperpendicularly to a cradle housing, so that a stylus supported by the stylus holder is more easily accessible.

39 Claims, 6 Drawing Sheets

CRADLE WITH COMBINED STATUS INDICATOR LIGHT AND STYLUS HOLDER

BACKGROUND OF THE INVENTION

1. Field of the Invention

This invention relates to the field of computer docks. In particular, the invention relates to a cradle for a portable computer.

2. Description of the Related Art

A computer cradle serves as a communication interface between a portable computer and a second computer, and also can serve as a charging station for the portable computer. The computer cradle also provides a convenient location to place a portable computer so that the screen of the portable computer is easily viewed.

A user often enters information into a portable computer with a stylus. When not in use, the stylus is stored in a cavity along the side of the portable computer. However, a stylus stored in the cavity can be relatively inaccessible and difficult to remove.

Therefore, it is desirable to have a computer cradle with a stylus holder capable of supporting a stylus at an accessible position and angle.

SUMMARY OF THE INVENTION

An aspect of various embodiments is to provide a cradle for a computer with a stylus holder at least partially formed from light transmissive material, thereby combining the functionality of a stylus holder and a status indicator light. Consequently, the complexity of manufacturing the cradle is reduced; for example, this reduces the part count, which is advantageous to the manufacturing process.

One embodiment of the invention includes a computer cradle including a housing, a stylus holder, and a light source. The housing forms a hole having a stylus holder positioned at least partially therein. The stylus holder is formed at least partially from material that transmits light. The light source is positioned in the housing to transmit light through the material that transmits light. The stylus holder thereby has the capabilities of both supporting a stylus and indicating, with light transmitted though the material of the stylus holder that transmits light, a status of the computer cradle or a computer coupled to the cradle. The functionality of the stylus holder is further increased; for example, combining the light transmissive material with the stylus holder makes the stylus holder easier to locate.

Another aspect of various embodiments is to provide a stylus holder for a computer cradle in a manner that allows a user to more easily use a stylus with the stylus holder. In some embodiments, the housing defines a cavity where the stylus holder is located. At least part of the cavity has a cross section that is substantially hourglass-shaped.

In other embodiments, at least part of the stylus holder includes a cavity with a cross section that is substantially funnel-shaped. The funnel-shape of the cavity and the nonperpendicular orientation of the body of the stylus holder on the housing facilitate placing the stylus in the stylus holder and removing the stylus from the stylus holder. For example, a front surface of the housing and a base of the housing form an angle approximately 45 degrees from the base. The stylus holder can support a stylus so that the stylus and the base form an angle approximately 120 degrees from the base. This example angle makes the stylus more accessible from a user's point of view.

Light transmitted through the stylus holder communicates significant information to a user of the computer cradle. In other embodiments of the invention, the light can indicate when the computer cradle properly couples with a portable computer, and the light can indicate one or more of several charge statuses of a portable computer. In further embodiments of the invention, the light can indicate information in various ways, such as emitting various colors, emitting various colors of light, emitting a light blinking at various rates, and emitting light at various brightness levels.

In some embodiments, the computer cradle can accept a portable computer. Other types of computers the computer cradle can accept include a palm size computer and a handheld computer. Another embodiment of the invention includes a computer cradle coupled to both a portable computer and a computer.

Further, some embodiments of the invention include a method of manufacturing a computer cradle comprises the acts of positioning a stylus holder at least partially in a hole defined by a housing, where the stylus holder is at least partially formed from light transmissive material; and positioning a light source in the housing such that the light source is adapted to provide light to the stylus holder.

Further, some embodiments of the invention include a method of using a computer cradle, comprises generating a signal in response to coupling a portable computer to a housing, where the housing includes a stylus holder at least partially formed from light transmissive material; transmitting light from at least part of the stylus holder in response to the signal; and supporting a stylus with the stylus holder.

DETAILED DESCRIPTION

Figure 1:
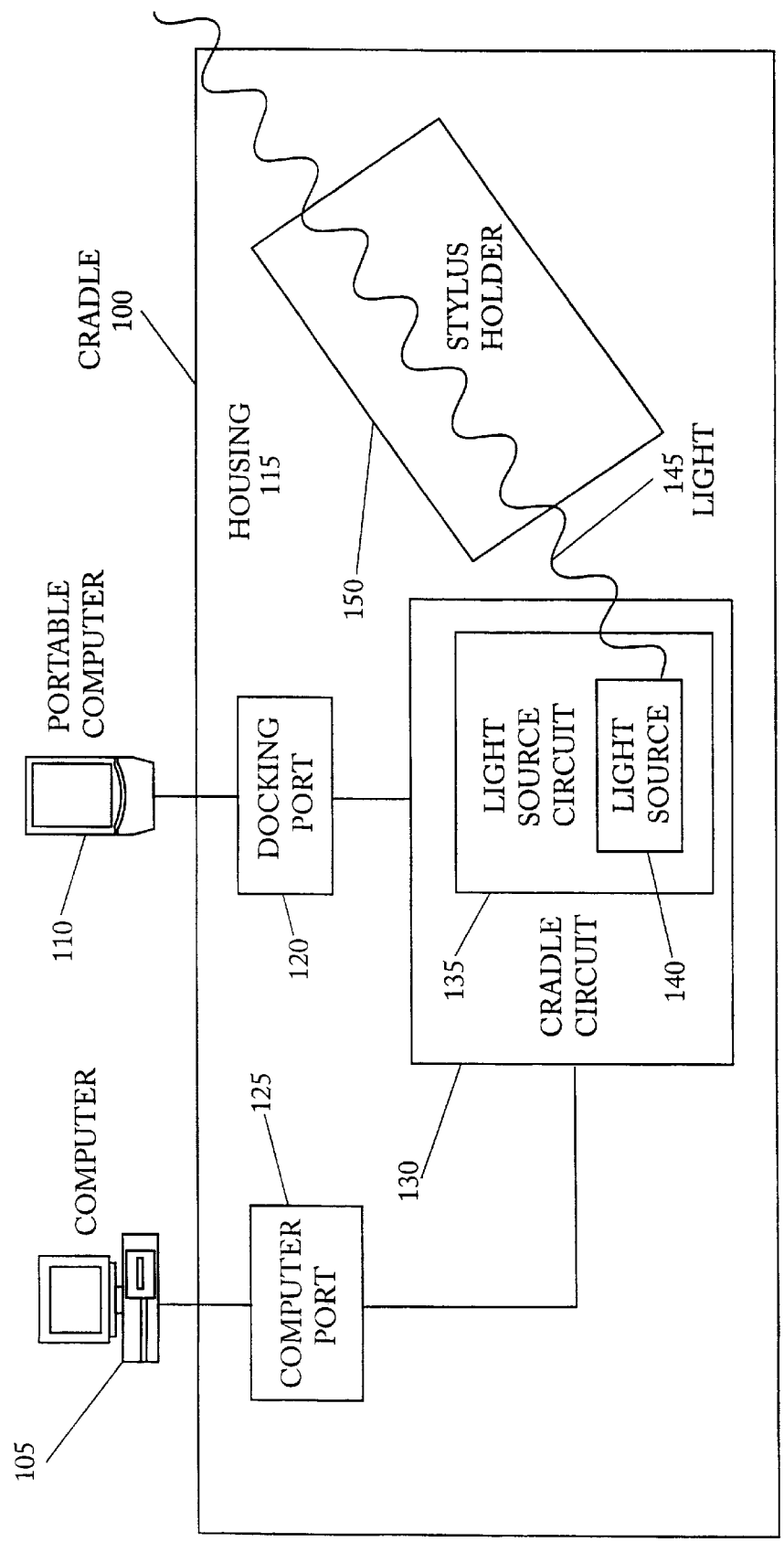
FIG. 1 illustrates a computer system including the computer cradle coupled with both a portable computer and a second computer.

A computer cradle 100 is shown in FIG. 1. The computer cradle 100 is an embodiment of the system when the computer cradle 100 is coupled to a computer 105 and a portable computer 110.

The computer cradle 100 is substantially enclosed in a housing 115. Both a docking port 120 and a computer port 125 are coupled to a cradle circuit 130. The portable computer 110 is coupled to the docking port 120. The computer 105 is coupled to the computer port 125. The portable computer 110 and the computer 105, exchange through the cradle circuit 130, information related to functions such as an address book, a daily organizer, and a to do list.

Other embodiments include computer cradles of different sizes to accept desktop computers and laptop computers. Further embodiments include computer cradles that couple via the computer port to laptop computers, portable computers, and desktop computers.

The cradle circuit 130 includes a light source circuit 135, which comprises a light source 140. In one embodiment, the light source circuit 135 activates the light source 140 when the portable computer 110 is coupled to the docking port 120. When the light source 140 is active, light 145 is transmitted to a stylus holder 150. The stylus holder 150 is made at least partially of light transmissive material, thereby transmitting at least some of the light 145 through the stylus holder 150 and illuminating the stylus holder 150 from a point of view external to the computer cradle 100. Combining the stylus holder 150 with a light indicator can simplify some aspects of the manufacturing process of the computer cradle 100, allows the stylus holder 150 to communicate information, and makes the stylus holder 150 easy to find and use.

One embodiment of the stylus holder 150 is a light pipe having a cavity to support a stylus. Various embodiments of the stylus holder 150 use light transmissive materials such as glass, plastic, Lexanrm, translucent material, transparent material, and other materials that transmit light. Other embodiments use multiple materials of varying opacity and color. Further embodiments use materials with various patterns such as spots, stripes, and cross-hatching. Such patterns obscure any stray marks inadvertently made on the stylus holder 150 by, for example, a pen placed in the stylus holder 150. Yet further embodiments use a stylus holder 150 integral to the housing 115. The stylus holder 150 in these embodiments is light transmissive by virtue of a housing 115 that is thinner in the region of the stylus holder 150. In another embodiment, the stylus holder 150 is coupled to the docking port 120.

The light source circuit 135 is included in an electrical connection between the light source 140 and the docking port 120. Coupling the portable computer 110 to the docking port 120 completes an electrical circuit, activating the light source 140 through the electrical connection. In other embodiments, the light source 140 indicates one of several charge statuses to indicate remaining power of the portable computer 110. In various embodiments, the light source circuit 135 includes circuits that cause the light source 140 to blink at varying rates and cause the brightness of the light source 140 to vary among several brightness levels. In other embodiments, part of the light source 140 blinks at one rate and another part of the light source blinks at another rate. In further embodiments, part of the light source emits light at one brightness level and another part of the light source emits light at another brightness level. These various embodiments of the light source 140 and the light source circuit 135 communicate information to the user, such as ongoing data transfer, a stage of data transfer, data transfer rate, charge state of the portable computer 110, connection state with the portable computer 110, connection state with the computer 105, and/or reminders of an appointment stored in the portable computer 110 or the computer 105.

The light source 140 in one embodiment includes one or more light emitting diodes (LEDs) positioned such that light emitted from the LEDs enters the stylus holder 150. In other embodiments, the light source 140 emits multiple colors. In other embodiments, one or more incandescent bulbs emit the light. The particular physics underlying the generation of light, for example incandescence and spontaneous photon emission, is not important. What is important is that the light source 140 generates light.

Figure 2:
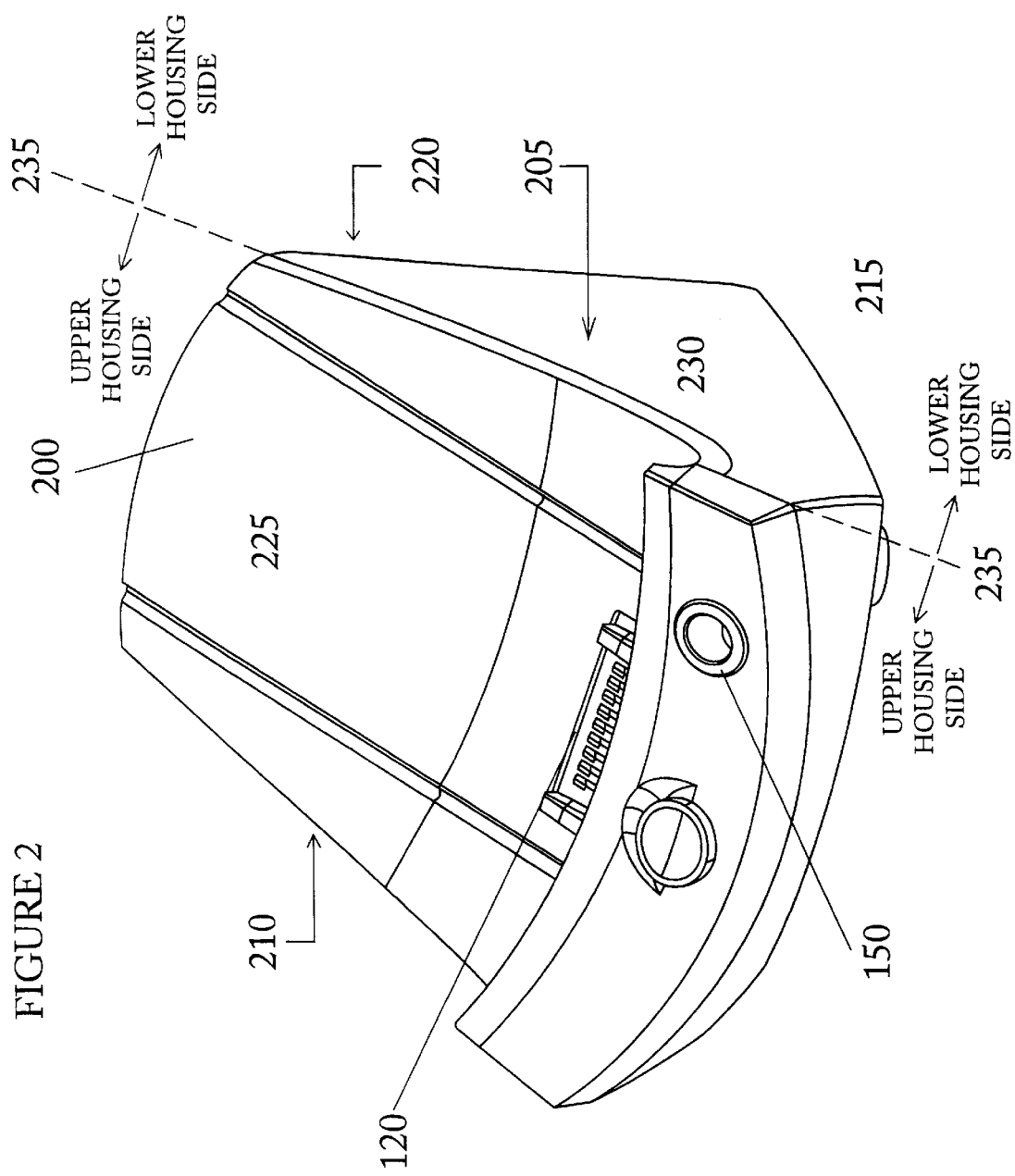
FIG. 2 illustrates a front right perspective view of the computer cradle.

FIG. 2 illustrates the computer cradle 100 from a front right perspective view. The housing 115 has a front face 200, a right side 205, a left side 210, a base 215, and a rear face 220. The housing 115 comprises an upper housing 225 and a lower housing 230. Viewing the computer cradle 100 from the right side 205, the line 235 illustrates a line along which the housing 115 is divided into the upper housing 225 and the lower housing 230. The housing 115 includes the stylus holder 150 and the docking port 120.

Figure 3:
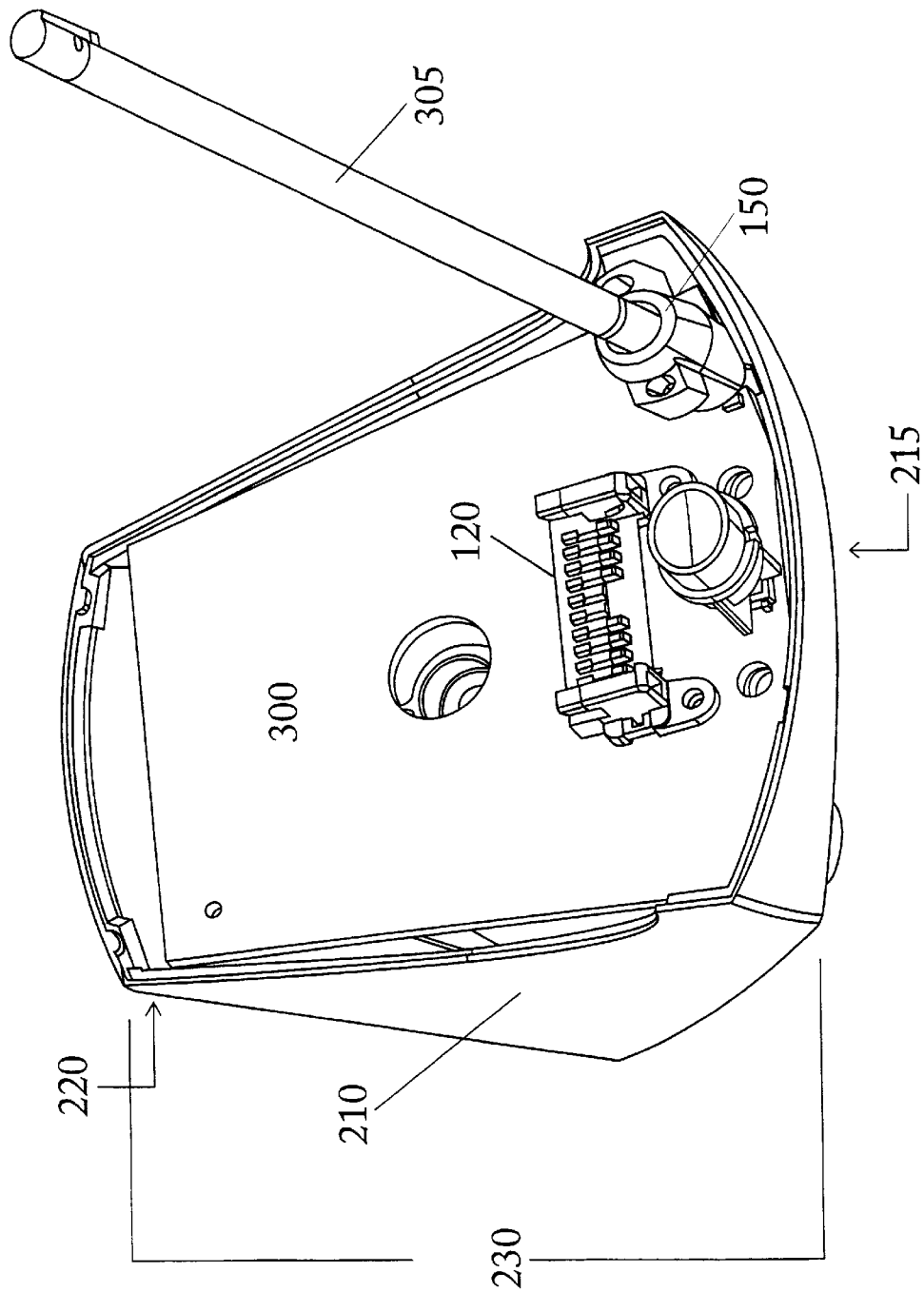
FIG. 3 illustrates a front left perspective view of a partially assembled computer cradle with a stylus inserted.

FIG. 3 illustrates from a front left perspective view a computer cradle 100 that is partially assembled. The lower housing 230 of the housing 115 is shown, but not the upper housing 225. A circuit board 300 rests in the lower housing 230. The docking port 120 and the cradle circuit 130 (not shown) are positioned on the circuit board 300. A stylus 305 is supported by the stylus holder 150. A ballast (not shown) rests in the lower housing 230 beneath the circuit board 300. The ballast adds stability to the computer cradle 100.

Figure 4:
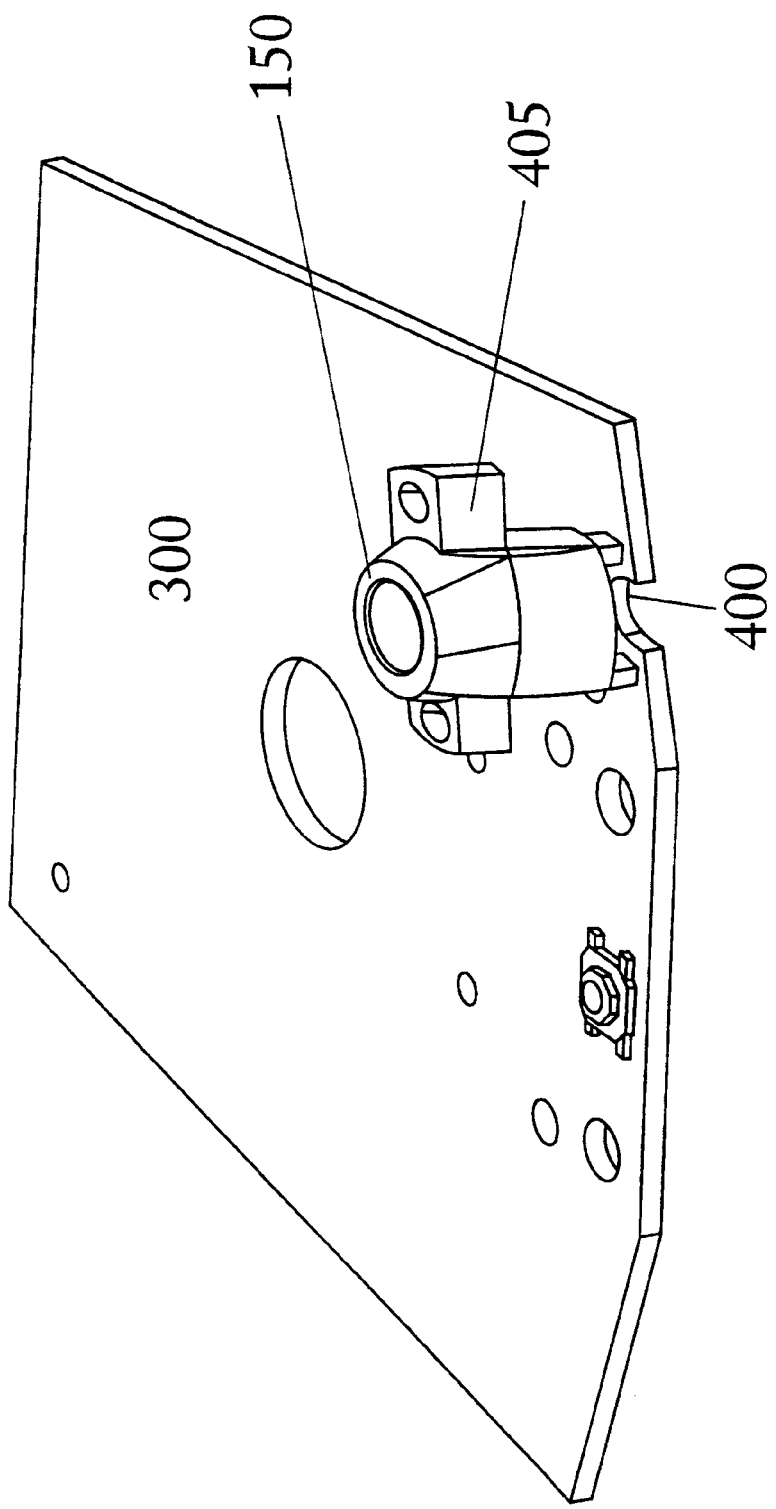
FIG. 4 illustrates a front right perspective view of a circuit board.

FIG. 4 illustrates the circuit board 300, which supports the stylus holder 150. The circuit board 300 has a notch 400 that prevents the circuit board 300 from blocking a stylus inserted into stylus holder 150, allowing the stylus to rest more deeply in the stylus holder 150. The notch 400 also removes from view the circuit board 300 which would otherwise be visible through the stylus holder 150 when the stylus holder 150 is not supporting the stylus. The stylus holder 150 is enclosed in a holder housing 405. The holder housing 405 is coupled to the housing 115 via heat stakes. The heat stakes on the housing 115 are perpendicular to the front face 200 of the housing 115 to facilitate automated assembly of the holder housing 405 with the housing 115. The heat stake receivers, or holes, on the holder housing 405 are not perpendicular to the front face 200 of the housing 115. The heat stake receivers are sized large enough such that the heat stake receivers, which have a longitudinal axis not parallel to a longitudinal axis of the heat stakes, can accept the heat stakes. Other embodiments may use ultrasonic welding, cold stakes, clips, and/or fasteners to couple the holder housing 405 to the housing 115.

Figure 5:
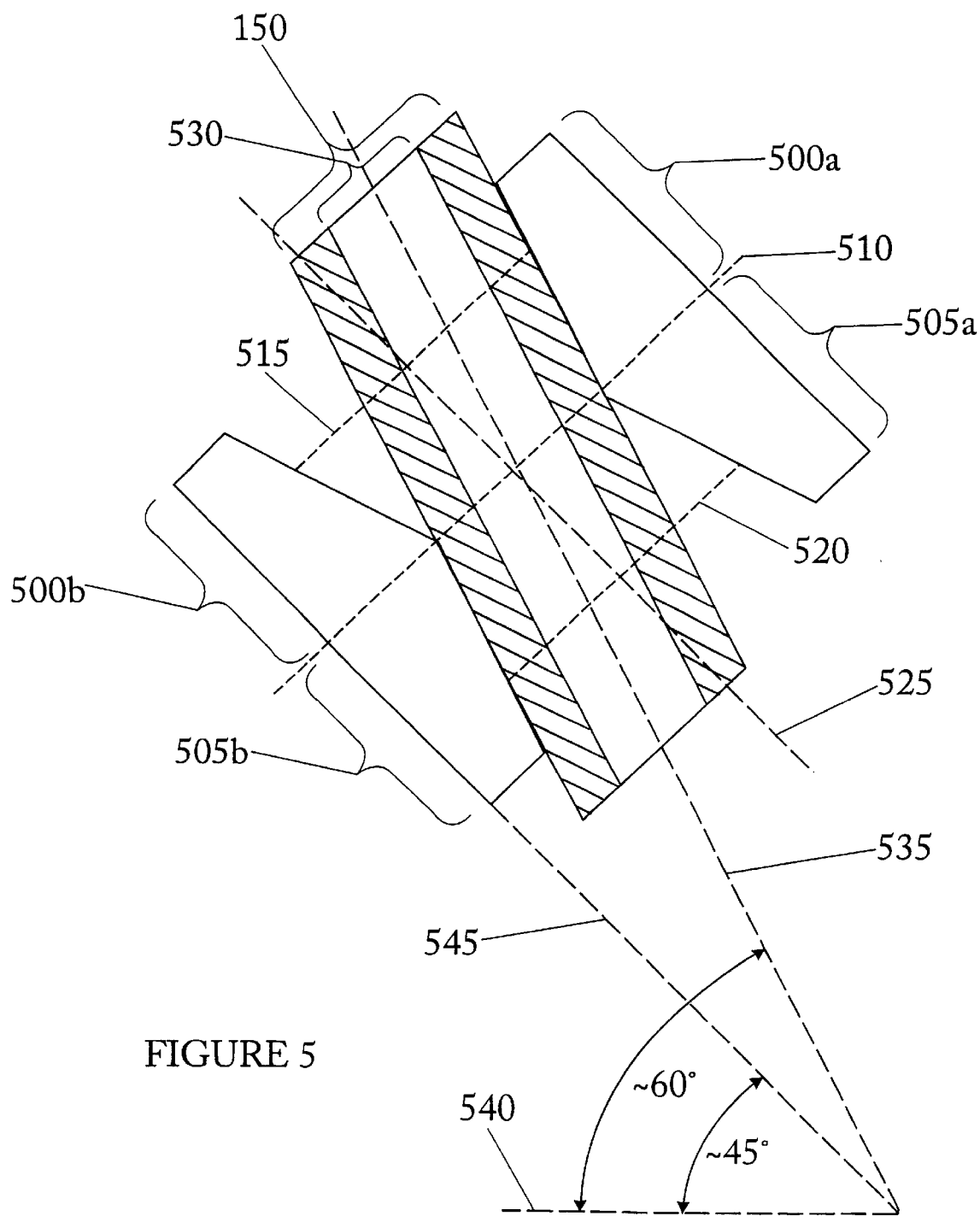
FIG. 5 illustrates a cross section of a portion of a housing supporting a stylus holder.

FIG. 5 illustrates a cross section of the stylus holder 150 supported in a cavity in the holder housing 405. The cross section of the cavity has an hourglass shape, with an upper portion 500 and a lower portion 505, separated by a line 510. The upper portion 500 is shown as an upper portion first side 500a and an upper portion second side 500b. The lower portion 505 is shown as a lower portion first side 505a and a lower portion second side 505b. An upper portion cross sectional width 515 reaches from the upper portion first side 500a to the upper portion second side 500b. The upper portion cross sectional width 515 narrows with increased proximity to the lower portion 505. A lower portion cross sectional width 520 reaches from the lower portion first side 505a to the lower portion second side 505b. The lower portion cross sectional width 520 narrows with increased proximity to the upper portion 500.

The cavity of the holder housing 405 has a longitudinal axis 525. The stylus holder 150 has a stylus cavity 530 adapted to support a substantially cylindrical stylus. The stylus holder 150 has a longitudinal axis 535. Line 540 represents a plane of the base 215. Line 545 is parallel to longitudinal axis 525. The approximately 45 degree angle between the line 545 and the line 540 represents the angle at which a stylus would be supported with respect to the plane of the base 215, in an embodiment lacking the hourglass-shaped cross section of the housing cavity. The approximately 60 degree angle between the line 535 and the line 540 represents the angle at which a stylus would be supported with respect to the plane of the base 215, in an embodiment having the hourglass-shaped cross section of the housing cavity. The hourglass-shaped housing cavity allows the stylus holder 150 to support a stylus at an angle ergonomically advantageous for a user, allowing the user to more easily reach the stylus in the stylus holder 150 and replace the stylus in the stylus holder 150. The approximately 60 degree angle corresponds to an approximately 120 degree angle from the base 215.

Figure 6:
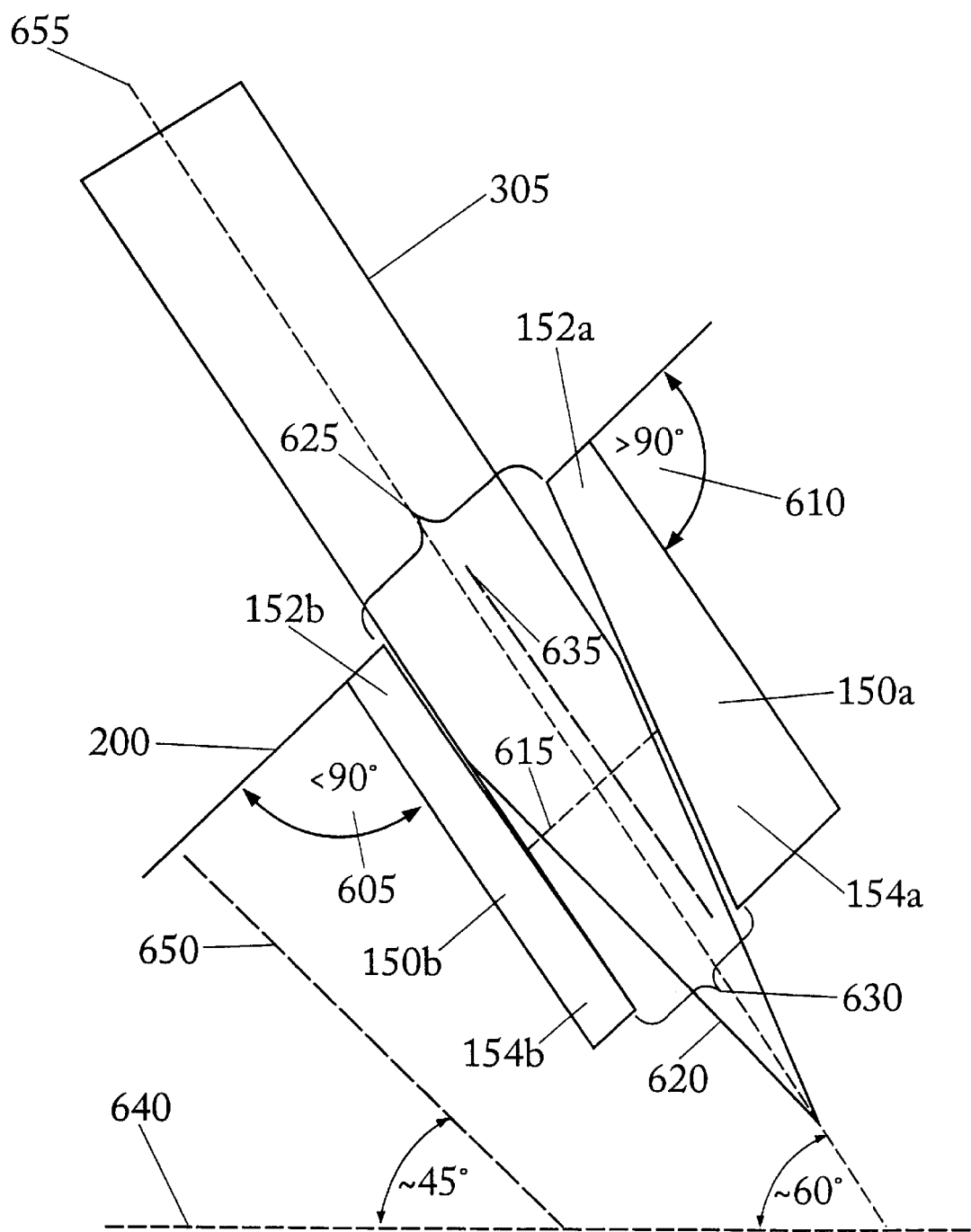
FIG. 6 illustrates a cross section of a stylus holder supporting a stylus.

FIG. 6 illustrates a cross section of the stylus holder 150 included in the holder housing 405. The cross section of the stylus holder 150 has an upper part 150a and a lower part 150b. Neither the heat stake receivers of the holder housing 405 nor the main body of the holder housing 405, which includes the stylus holder 150, is perpendicular to the front face 200 of the housing 115. Thus, one portion of the stylus holder 150 forms an acute angle 605 with respect to the front face 200 of the housing 115, and another portion of the stylus holder 150 forms an obtuse angle 610 with respect to the front face 200 of the housing 115. The stylus holder 150 has a first end 152 and a second end 154. The first end 152 of the stylus holder 150 is shown in two parts 152a and 152b, and the second end 154 of the stylus holder 150 is shown in two parts 154a and 154b. A cross sectional width 615 reaches from the upper part 150a to the lower part 150b. The cross sectional width 615 is longer at the first end 152 than at the second end 154. The stylus holder 150 thereby defines a funnel-shaped cavity which is adapted to support a stylus 305 and particularly a stylus 305 with a tapered tip 620. The funnel-shaped cavity has a first opening 625 at the first end 152 of the stylus holder 150 and a second opening 630 at the second end 154 of the stylus holder 150. The funnel-shaped cavity is not centered with respect to a longitudinal axis 635 of the stylus holder 150. The first opening 625 is centered, but the second opening 630 is not centered, with respect to the longitudinal axis 635.

Line 640 represents a plane of the base 215. Line 650 is perpendicular to the front face 200 of the housing 115. The approximately 45 degree angle between the line 650 and the line 640 represents the angle at which a stylus 305 would be supported with respect to the plane of the base 215, in an embodiment lacking both the funnel-shaped cavity of the stylus holder 150 and the non-perpendicular orientation of the stylus holder 150 with respect to the front face 200 of the housing 115. The stylus 305 has a longitudinal axis 655. The approximately 60 degree angle between the line 655 and the line 640 represents the angle at which a stylus 305 would be supported with respect to the plane of the base 215. The stylus holder 150 thereby supports the stylus 305 at an angle ergonomically advantageous for a user, allowing the user to more easily reach the stylus 305 in the stylus holder 150 and replace the stylus 305 in the stylus holder 150. The approximately 60 degree angle also corresponds to an approximately 120 degree angle from the base 215.

In other embodiments, the stylus 305 would be supported at approximately angles of 30 degrees, 90 degrees, 120 degrees, and 150 degrees with respect to the plane of the base 215, or any angle between 20–160 degrees with respect to the plane of the base 215. In yet other embodiments, the longitudinal axis of the holder housing 405 forms angles approximately of 30 degrees and 60 degrees, or any angle between 20–80 degrees with respect to the plane of the base 215. All the above angles are for illustration only and other embodiments include different angle combinations not limited to the angles above. Other embodiments include different cross sections of the housing cavity, stylus holders seated at different positions in the housing cavity, adjustable stylus holders adapted to support a stylus at a range of angles with respect to the base 215, and stylus holders with stylus cavities of various cross sections to accommodate styluses of various shapes and hues.

The foregoing description of various embodiments of the invention have been presented for purposes of illustration and description. It is not intended to limit the invention to the precise forms disclosed. Many modifications and equivalent arrangements will be apparent.

What is claimed is:

1. A computer cradle for supporting a portable computer, the computer cradle comprising:

a housing shaped to support the portable computer so that a screen of the portable computer is viewable;

a stylus holder positioned at least partially in the housing, and the stylus holder at least partially formed from light transmissive material; and a light source positioned in the housing to transmit light through the light transmissive material.

2. The computer cradle of claim 1, wherein the stylus holder defines a cavity adapted to hold a substantially cylindrical stylus.

3. The computer cradle of claim 1, wherein at least a portion of the stylus holder has a substantially hourglass shaped cross section.

4. The computer cradle of claim 1, wherein the stylus holder has at least an upper portion and a lower portion, and at least part of the upper portion has an upper cross sectional width narrowing with increased proximity to the lower portion, and at least part of the lower portion has a lower cross sectional width narrowing with increased proximity to the upper portion.

5. The computer cradle of claim 1, wherein at least a portion of the stylus holder has a substantially funnel shaped cross section.

6. The computer cradle of claim 1, wherein the stylus holder has a top end and a bottom end, and at least part of the stylus holder defines a cavity, and at least part of the cavity has a cross sectional width narrowing with increased distance from the top end and increased proximity to the bottom end.

7. The computer cradle of claim 1, wherein the housing includes a base and a front surface, and the front surface and the base form an angle approximately 45 degrees from the base, and the stylus holder is positioned at least partially in the base such that the stylus holder is adapted to support a stylus, and a longitudinal axis of the stylus and the base form an angle approximately 120 degrees from the base.

8. The computer cradle of claim 7, wherein the stylus holder is coupled to the base such that at least part of the stylus holder and the front surface form an angle less than 90 degrees.

9. The computer cradle of claim 1, wherein the housing includes a port positioned to mate with a connector to the portable computer.

10. The computer cradle of claim 9, wherein the computer cradle includes an electrical connection between the light source and the port.

11. The computer cradle of claim 10, wherein the electrical connection is adapted to activate the light source when the port mates with the portable computer.

12. The computer cradle of claim 1, wherein the stylus holder is at least partially formed from translucent material.

13. The computer cradle of claim 1, wherein the stylus holder is at least partially formed from plastic.

14. The computer cradle of claim 1, wherein the stylus holder is at least partially formed from glass.

15. The computer cradle of claim 1, wherein the light source includes one or more light emitting diodes.

16. The computer cradle of claim 1, wherein the light source includes one or more incandescent bulbs.

17. The computer cradle of claim 1, wherein the light source is adapted to emit light when the computer cradle is coupled to the portable computer.

18. The computer cradle of claim 1, wherein the light source is adapted to emit light when the computer cradle accepts the portable computer.

19. The computer cradle of claim 1, wherein the light source is adapted to indicate one or more of a plurality of charge statuses of the portable computer.

20. The computer cradle of claim 1, wherein the light source is adapted to emit light, in response to a signal generated from the portable computer coupled to the computer cradle.

21. The computer cradle of claim 1, wherein the light source is adapted to emit one or more of a plurality of colors of light.

22. The computer cradle of claim 21, wherein a first part of the light source is adapted to emit a first color of the plurality of colors, and a second part of the light source is adapted to emit a second color of the plurality of colors of light, wherein the first color and the second color are different.

23. The computer cradle of claim 1, wherein the light source is adapted to emit a blinking light.

24. The computer cradle of claim 23, wherein the light source blinks at one or more of a plurality of blinking rates.

25. The computer cradle of claim 1, wherein the light source is adapted to emit light at one or more of a plurality of brightness levels.

26. The computer cradle of claim 25, wherein a first part of the light source is adapted to emit light at a first brightness level of the plurality of brightness levels, and a second part of the light source is adapted to emit light at a second brightness level of the plurality of brightness levels.

27. The computer cradle of claim 1, further comprising a ballast coupled to the housing.

28. The computer cradle of claim 1, further comprising a stylus coupled to the stylus holder.

29. A computer cradle for supporting a portable computer, the computer cradle comprising:
    a housing comprising a base, a lower housing and an upper housing, the base supporting the housing on a base plane, the upper housing being configured to support the portable computer along a front face that is acute relative to the base plane;
    a stylus holder positioned at least partially in the housing so as to extend a stylus away from the front face, and the stylus holder at least partially formed from light transmissive material;
    a ballast at least partially enclosed by the lower housing; and
    a circuit board coupled to the upper housing, and wherein the circuit board includes a light source circuit positioned to transmit light through the light transmissive material.

30. A computer dock, comprising:
    a housing having a base for supporting the computer dock on a plane;
    a port coupled to the base and positioned so as to mate with a connector of the portable computer;
    a stylus holder provided on the housing, the stylus holder at least partially formed from light transmissive material, the stylus holder being configured to support a stylus along an axis that is acute to the plane of the base; and
    a circuit board coupled to the housing, and wherein the circuit board includes a light source circuit positioned to transmit light through the light transmissive material.

31. The computer dock of claim 30 further comprising a cradle circuit coupled to the dock port and to the light source, and the cradle adapted to activate the light source when a computer is coupled to the docking port.

32. A computer system, comprising:
    a computer dock including:
        a housing having a base for supporting the computer dock on a plane;
        a docking port coupled to the base;
        a stylus holder provided on the housing, the stylus holder at least partially formed from light transmissive material, the stylus holder being configured to support a stylus along an axis that is acute to the plane of the base;
        a circuit board housed within the housing, the circuit board including a light source circuit positioned to transmit light through the light transmissive material; and
        a portable computer positionable on the docking port, the portable computer including a computer port that mates with the docking port when the portable computer is supported by the housing.

33. A computer system, comprising:
    a computer dock including:
        a base;
        a docking port coupled to the base;
        a computer port coupled to the base;
        a stylus holder coupled at least partially to at least one of the base and the docking port, and the stylus holder at least partially formed from light transmissive material;
        a circuit board coupled to the upper housing; and the circuit board including a light source circuit positioned to transmit light through the light transmissive material;
    a portable computer coupled to the docking port; and
    a computer coupled to the computer port.

34. The computer system of claim 33, wherein the computer includes at least one of a desktop computer, a laptop computer, and a portable computer.

35. A method of manufacturing a computer cradle, comprising:
    forming a housing to support a portable computer so as to provide access to a display of the portable computer when the portable computer is being supported by the housing;
    positioning a stylus holder at least partially in a hole defined by a housing, and the stylus holder at least partially formed from light transmissive material; and
    positioning a light source in the housing such that the light source is adapted to provide light to the stylus holder.

36. The method of claim 35, further comprising coupling a circuit board to the housing.

37. The method of claim 35, further comprising coupling a ballast to the housing.

38. A method of using a computer cradle, comprising:
    generating a signal in response to coupling a portable computer to a housing, and the housing including a stylus holder at least partially formed from light transmissive material;
    transmitting light from at least part of the stylus holder in response to the signal; and
    supporting a stylus with the stylus holder.

39. A cradle for a portable computer, the cradle comprising:
    a housing;
    a stylus holder positioned at least partially in the housing, and the stylus holder at least partially formed from light transmissive material; and a light source positioned in the housing to transmit light through the light transmissive material;

wherein the housing includes a base and a front surface, and the front surfacer and the base form an angle approximately 45 degrees from the base, and the stylus holder is positioned at least partially in the such that the stylus holder is adapted to support a stylus, and a longitudinal axis of the stylus and the base form a angle approximately 120 degrees from the base; and wherein the stylus holder defines a cavity such that a first end of the stylus holder defines a first opening into the cavity and a second end of the stylus holder defines a second opening into the cavity, and at least one of the first opening and the second opening is off center in relation to a longitudinal axis of the stylus holder.

* * * * *